United States Patent [19]
Kim et al.

[11] Patent Number: 5,734,768
[45] Date of Patent: Mar. 31, 1998

[54] ALIGNING APPARATUS FOR OPTICAL COUPLING AND MANUFACTURING METHOD THEREOF

[75] Inventors: Yeong-Ju Kim, Yeonki-gun; Chan-Sik Park, Gumi, both of Rep. of Korea

[73] Assignee: SamSung Electronics Co., Ltd., Suwon, Rep. of Korea

[21] Appl. No.: 728,685

[22] Filed: Oct. 10, 1996

[30] Foreign Application Priority Data

Oct. 12, 1995 [KR] Rep. of Korea ............... 35085/1995

[51] Int. Cl.$^6$ ............................................. G02B 6/26
[52] U.S. Cl. ............................ 385/52; 385/60; 385/68; 385/72; 385/97
[58] Field of Search ........................... 385/52, 53, 60, 385/68, 72, 78, 85, 97

[56] References Cited

U.S. PATENT DOCUMENTS

| | | | |
|---|---|---|---|
| 5,097,524 | 3/1992 | Wasserman et al. | 385/73 |
| 5,193,133 | 3/1993 | Schofield et al. | 385/85 |
| 5,212,745 | 5/1993 | Miller | 385/52 X |
| 5,251,276 | 10/1993 | Berkey et al. | 385/43 |
| 5,418,876 | 5/1995 | Lee | 385/80 |
| 5,464,361 | 11/1995 | Suzuki et al. | 451/28 |
| 5,600,739 | 2/1997 | Anderson et al. | 385/16 |

FOREIGN PATENT DOCUMENTS

| | | |
|---|---|---|
| 1498600 | 10/1976 | United Kingdom . |
| 1576336 | 11/1976 | United Kingdom . |

*Primary Examiner*—Phan T. H. Palmer
*Attorney, Agent, or Firm*—Robert E. Bushnell, Esq.

[57] ABSTRACT

An aligning apparatus for optical fiber coupling and the manufacturing method there of are disclosed. An aligning apparatus for optical coupling devices, includes a ferrule having a hole confining an optical fiber thereinside to make the optical fiber move freely within the space of the hole for holding the optical fiber; a ferrule holding jig placed outside the ferrule; a first optical fiber jig at the upper end of the ferrule holding jig for supporting and holding the optical fiber already inserted into the ferrule; a first hole at the center of the first optical fiber jig for receiving the optical fiber thereinside, a second optical fiber jig at the lower end of the ferrule holding jig for holding the optical fiber already inserted into the ferrule; a second hole at the center of the second optical fiber jig for receiving the optical fiber thereinside; a control means controlling the positions of the first optical fiber jig and the second optical fiber jig for aligning the optical fiber in the X, Y, and Z directions.

30 Claims, 4 Drawing Sheets

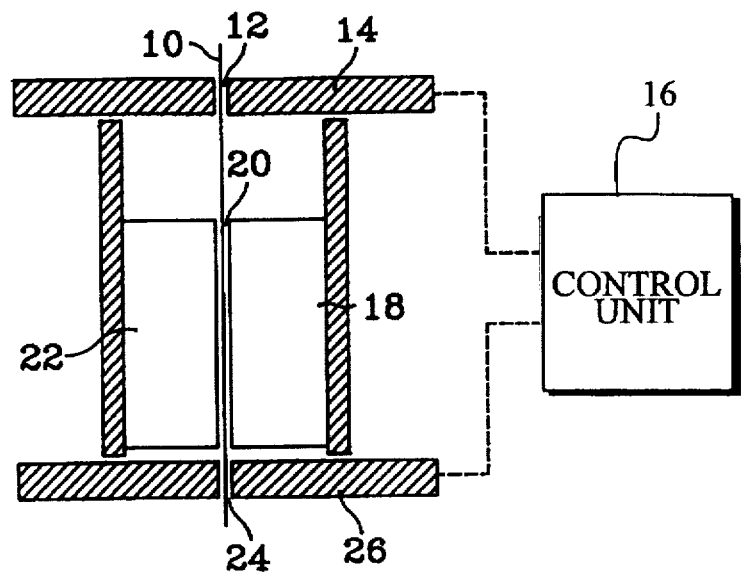
Fig_1
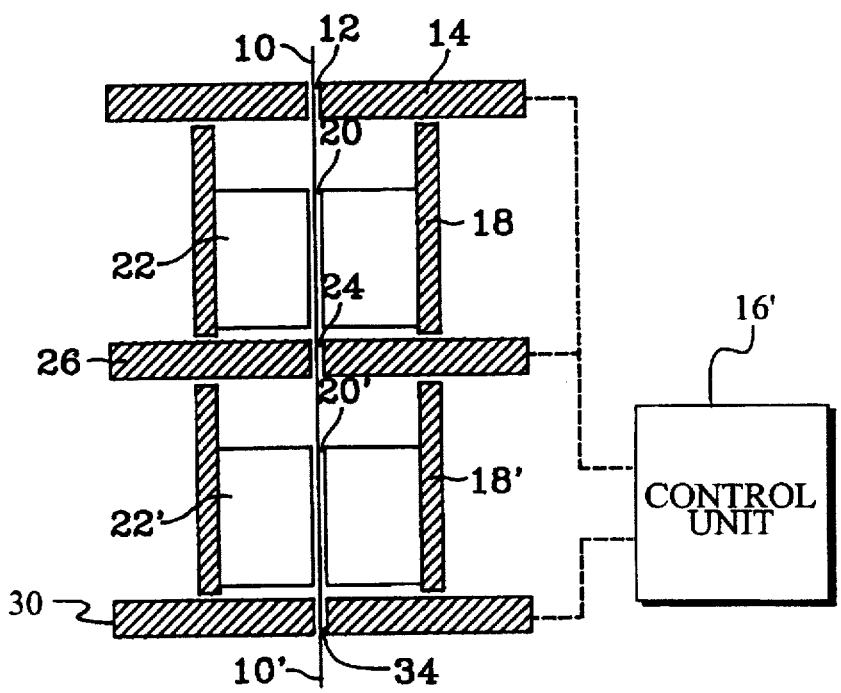
Fig_2

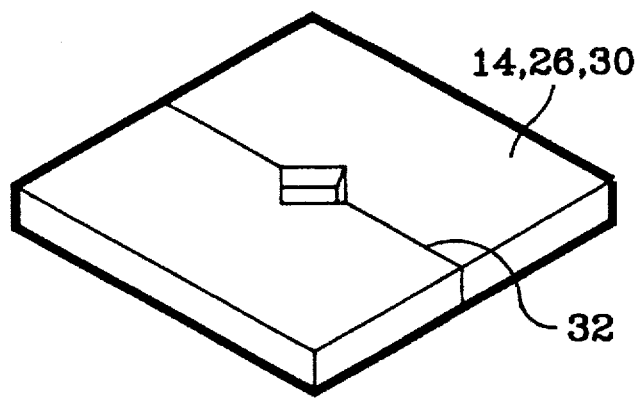
Fig_3A
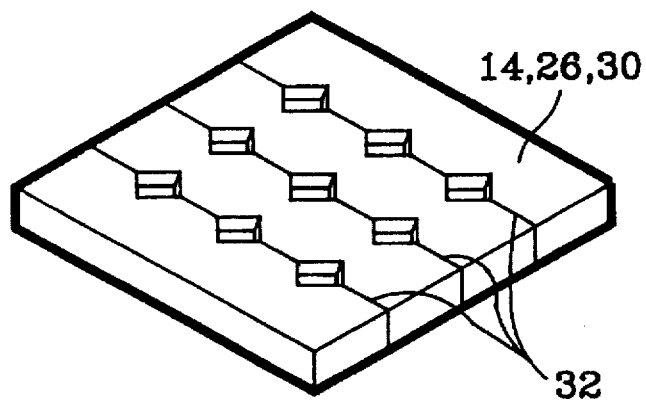
Fig_3B
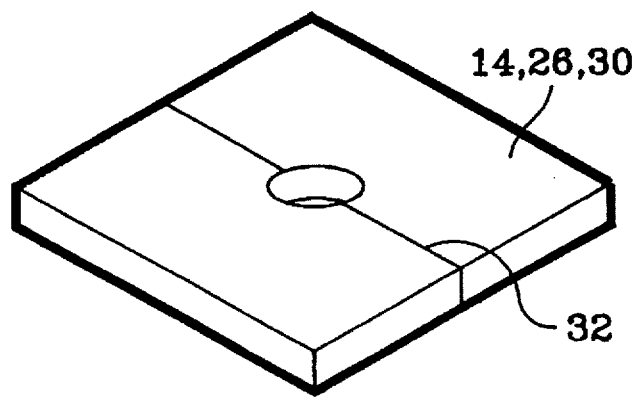
Fig_3C

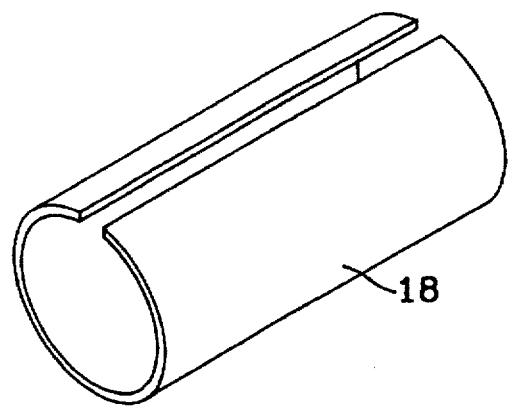
Fig_4
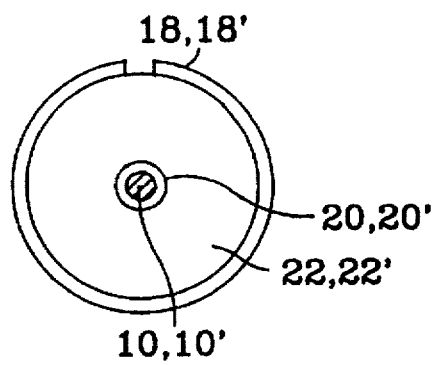
Fig_5
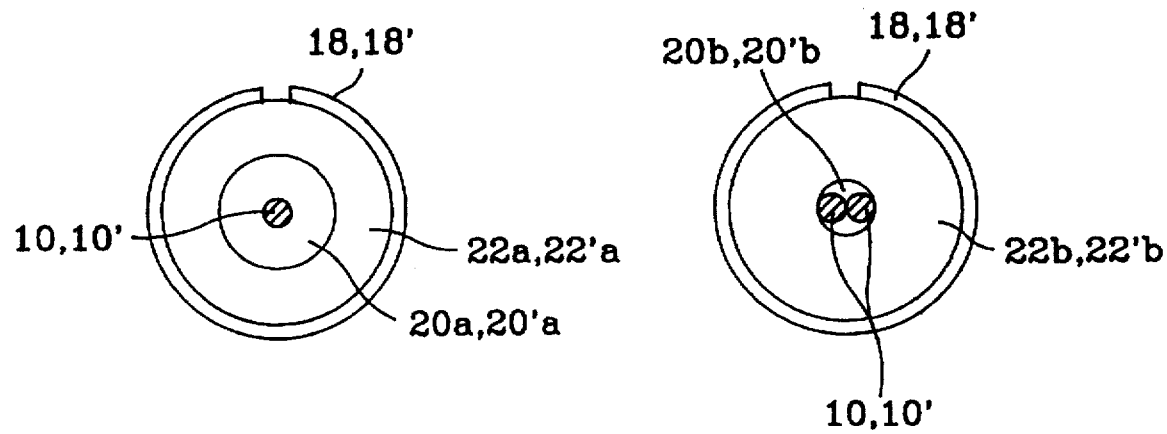
Fig_6　　　Fig_7

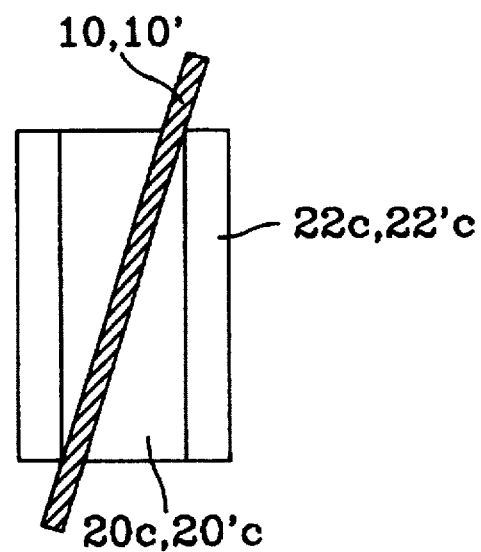
Fig_8
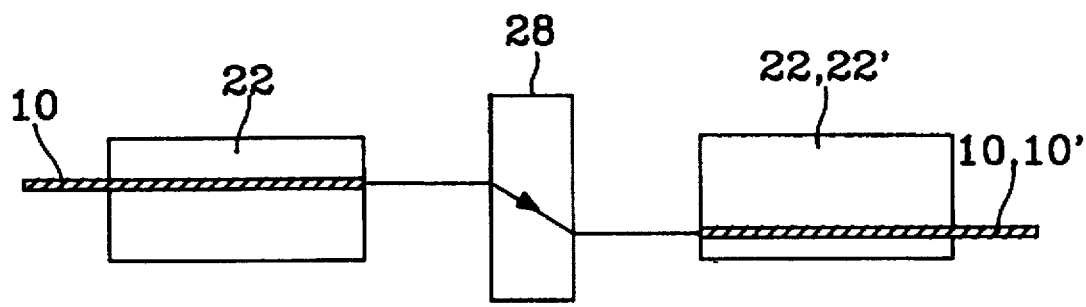
Fig_9

ALIGNING APPARATUS FOR OPTICAL COUPLING AND MANUFACTURING METHOD THEREOF

CLAIM OF PRIORITY

This application makes reference to, incorporates the same herein, and claims all benefits accruing under 35 U.S.C. §119 from an application entitled Aligning Apparatus For Optical Coupling And Manufacturing Method Thereof earlier filed in the Korean Industrial Property Office on 12 Oct. 1995, and there duly assigned Ser. No. 35085/1995 by that Office.

BACKGROUND OF THE INVENTION

1. Field of the Invention

This invention relates generally to an optical fiber coupling. In particular, it relates to an aligning apparatus for optical fiber connections or optical coupling devices and the manufacturing method thereof.

2. Description of the Related Art

It is known in the art to fix a ferrule to an end of an optical fiber using ceramic or plastic ferrules and fixing the optical fiber into the ferrule using an adhesive such as epoxy. There are various known methods for fixing a ferrule to the end of the optical fiber as exemplified by the following patents incorporated herein by reference: U.S. Pat. No. 5,464,361 to Nobuo Suzuki entitled Method Of Making Fiber Termination; U.S. Pat. No. 5,418,876 to Hsin Lee entitled Fiber Optic Connector With Epoxy Preform; U.S. Pat. No. 5,251,276 to George E. Berkey, et al. entitled Environmentally Robust Fiber Optic Coupler And Method; U.S. Pat. No. 5,193,133 to Philip W. Schofield, et al. entitled Method Of Terminating Optical Fiber Utilizing A Plastic Alignment Ferrule With Polishing Ferrule; and U.S. Pat. No. 5,097,524 to Alexander Wasserman, et al. entitled Optical Fiber Termination.

As is known, the optical fiber is fixed after being centered in the ferrule as precisely as possible. Then the ferrule positions at the input end and the output end are adjusted according to the input/output angles of light. Consequently the optical fibers are aligned as a result of this operation on the ferrules.

Some shortcomings in aligning optical fibers through the ferrules by the known methods include: high costs of a precision machining step; technologically demanding fiber coupler construction involved with special ferrules and additional mechanical centerings as well as precision alignment required for the optical fiber containing more than one fiber; prolonged time required for the connection of optical fibers and the construction of optical couplers because of its dependence on the precision of an optical fiber ferrule and an aligning tool; low productivity due to the increased number of steps required; and increased junction loss at the connection between optical fibers containing multi-fibers due to the concentric placement of fibers.

SUMMARY OF THE INVENTION

Accordingly, it is an object of the present invention to provide an optical fiber aligning apparatus and manufacturing method thereof, which do not depend on the precision of an aligning device and a ferrule in the connection of optical fibers and the construction of a fiber coupler.

Another object is to provide an optical fiber aligning apparatus and manufacturing method thereof capable of aligning and fixing simultaneously the end portions of an optical fiber during the construction of a fiber coupler.

A further object is to provide an optical fiber aligning apparatus and manufacturing method thereof capable of connecting optical fibers containing more than one optical fiber for constructing optical couplers.

Yet another object is to provide an optical fiber aligning apparatus and manufacturing method thereof capable of selectively disposing a center optical fiber and surrounding optical fibers in optical couplers, such as wavelength multiplexers, using multiple optical fibers.

Still another object is to provide an optical fiber aligning apparatus and manufacturing method thereof that can minimize the connection loss at the multiple optical fibers connection.

An additional object of the invention is to provide an optical fiber aligning apparatus and manufacturing method thereof, reducing the reflection loss at an optical coupler equipped with a ball lens by aligning optical fibers with axis not on the center of the lens.

A still further object of the invention is to provide an optical fiber aligning apparatus and manufacturing method thereof, which can offer a ground optical fiber effect by aligning and fixing an optical fiber, so that the optical fiber and the inner wall of a ferrule maintain a predetermined angle.

A yet further object of the invention is to provide an economical and less time consuming optical fiber aligning apparatus without aligning tools.

An aligning apparatus of the invention for optical coupling devices, may be constructed with: a ferrule for holding an optical fiber, the ferrule having a bore for receiving an optical fiber thereinside, the bore having a predetermined size for allowing the optical fiber to move freely within the hole; a ferrule holding jig placed outside the ferrule; a first optical fiber jig at an upper end of the ferrule holding jig for supporting and holding the optical fiber already inserted into the ferrule; a hole at the center of the first optical fiber jig for passing the optical fiber therethrough to the bore of the ferrule, a second optical fiber jig at a lower end of the ferrule holding jig for holding the optical fiber already inserted into the ferrule; a hole at the center of the second optical fiber jig for receiving the optical fiber therethrough to the bore of the ferrule; a control unit for controlling the positioning of the first optical fiber jig and the second optical fiber jig for aligning the optical fiber in any one of the X, Y, and Z directions.

The manufacturing method of the invention comprises the steps of: covering a first optical fiber and a second optical fiber with epoxy; making one or more ferrules having a bore whose diameter is greater than the diameter of the optical fibers cladding by more than 0.001 mm; threading, or inserting, an optical fiber into the ferrle's bore; inserting the ferrule threaded with the optical fiber into a ferrule holding jig; either passing one end of the optical fiber through a first hole in a first optical fiber jig and then passing the other end of the first optical fiber through a second hole in a second optical fiber jig, or passing one end of the second optical fiber through a second hole in a second optical fiber jig and then passing the other end of the second optical fiber through a third hole in a third olitical fiber jig; aligning the optical fibers in the X, Y, and Z directions in the bores of the ferrules by the first optical fiber jig, the second optical fiber jig, and the third optical fiber jig by moving the jigs up/down and left/right under the control of a control unit; fixing the optical fiber in the ferrule by hardening the epoxy covering the optical fiber either naturally or under ultraviolet light; and, after the hardening of the epoxy, marking the position of the optical fibers and removing the ferrules from the-ferrule holding jigs, and then grinding the faces of the ferrules.

BRIEF DESCRIPTION OF THE DRAWINGS

A more complete appreciation of the invention, and many of the attendant advantages thereof, will be readily apparent as the same becomes better understood by reference to the following detail description when considered in conjunction with the accompanying drawings in which like reference symbols indicate the same or similar components, wherein:

FIG. 1 is a sectional view of an aligning apparatus for an optical coupler according to the principles of the present invention;

FIG. 2 is a sectional view of another aligning apparatus for an optical coupler according to the principles of the present invention;

FIG. 3A to FIG. 3C are perspective views of various optical fiber jigs for holding one or more optical fiber according to the principles of the present invention;

FIG. 4 is a perspective view of a ferrule holding jig for holding a ferrule according to the principles of the present invention;

FIG. 5 is a sectional view showing a single-core optical fiber, a ferrule and a ferrule holding jig according to an aligning apparatus for making an optical coupler according to the principles of the present invention;

FIG. 6 is a sectional view showing another single-core optical fiber, a ferrule and a ferrule holding jig according to an aligning apparatus for making another optical coupler according to the principles of the present invention;

FIG. 7 is a sectional view showing a dual-core optical fiber, a ferrule and a ferrule holding jig according to an aligning apparatus for making yet another optical coupler according to the principles of the present invention;

FIG. 8 is a sectional view showing an optical fiber ferrule made according to an aligning apparatus according to the principles of the present invention for aligning an optical fiber with inclination; and FIG. 9 is a schematic illustration of an optical fiber coupling made by an aligning apparatus according to the principles of the present invention.

DETAILED DESCRIPTION OF THE PREFERRED EMBODIMENT

With reference to the attached figures, respective embodiments of the invention will be described in detail.

A first embodiment of an aligning apparatus will be discussed with reference to FIGS. 1 and 4. The aligning apparatus has a ferrule 22, made of ceramic or silica, supporting a single optical fiber 10, or multiple optical fibers 10, as will be discussed below with respect to FIGS. 3A-3C. A ferrule bore 20 in ferrile 22 offers a space within which optical fiber 10 maybe positioned. A ferrule holding jig 18, in the shape of a sleeve, a cylinder, or a groove, nearly encircles the outer periphery of ferrule 22 in order to firmly hold ferrule 22. A first optical fiber jig 14 firmly holds a first end of optical fiber 10 in a hole 12, and is movable in the X, Y, and Z directions in response to a control unit 16. A second optical fiber jig 26 firmly holds an opposite end of optical fiber 10 in a hole 24, and is movable in the X, Y, and Z directions in response to a control unit 16. Ferrule holding jig 18 is not moved by the operation of control unit 16 during manipulation of first optical fiber jig 14 and second optical fiber jig 26. It should be understood that control unit 16 operates manually or automatically.

The apparatus shown in FIG. 1 aligns the two opposite ends of optical fiber 10, however, the apparatus can be used to align two separate optical fibers by threading one end of optical fiber 10 through hole 12 in jig 14 and threading one end of a second optical fiber through hole 24 in jig 26.

A second embodiment of the aligning apparatus will be discussed with reference to FIGS. 2 and 4. The aligning apparatus has a ferrule 22, made of ceramic or silica, supporting a single optical fiber 10, or multiple optical fibers 10, as will be discussed below with respect to FIGS. 3A-3C. A ferrule bore 20 in ferrule 22 offers a space within which optical fiber 10 may be positioned. A ferrule holding jig 18, in the shape of a sleeve, a cylinder, or a groove, nearly encircles the outer periphery of ferrule 22 in order to firmly hold ferrule 22. A first optical fiber jig 14 firmly holds one end of optical fiber 10 in a hole 12, and is movable in the X, Y, and Z directions in response to a control unit 16'. A second optical fiber jig 26 firmly holds the end of optical fiber 10 threaded through ferrule 22 in a hole 24, and is movable in the X, Y, and Z directions in response to a control unit 16. Ferrule holding jig 18 is not moved by the operation of control unit 16' during manipulation of first optical fiber jig 14 and second optical fiber jig 26. The aligning apparatus has a second ferrule 22', made of ceramic or silica, supporting a single optical fiber 10', or multiple optical fibers 10', as will be discussed below with respect to FIGS. 3A-3C. A ferrule bore 20' in ferrule 22' offers a space within which optical fiber 10' may be positioned. A ferrule holding jig 18', in the shape of a sleeve, a cylinder, or a groove, nearly encircles the outer periphery of ferrule 22' in order to firmly hold ferrule 22'. A third optical fiber jig 30 firmly holds one end of optical fiber 10' in a hole 34, and is movable in the X, Y, and Z directions in response to a control unit 16'. Second optical fiber jig 26 firmly holds the end of optical fiber 10' threaded through ferrule 22' in hole 24 while at the same time holding the end of optical fiber 10 threaded through ferrule 22. Ferrule holding jig 18' is not moved by the operation of control unit 16' during manipulation of third optical fiber jig 30 and second optical fiber jig 26. It should be understood that control unit 16' operates manually or automatically.

As shown in FIGS. 3A-3C, the optical fiber jigs 14, 26 and 30 can be formed using two more parts separable at separation chuck(s) 32. These separable pans have one or more V-grooves or semicircle grooves, which, when aligned with the V-grooves or semicircle grooves of an adjacent part, form holes 12, 24, and 34 for holding the optical fibers 10 and 10' inserted into ferrules 22 and 22'. The number of V-grooves or semicircle grooves used in the jigs depends on the number of optical fibers being utilized. Each separation chuck 32 is provided in order to permit the optical fiber 10 and ferrule 22 to be removed from the alignment apparatus after the alignment process.

With respect to FIGS. 1, 2 and 5, the aligning method utilizing the aligning apparatus, which is independent of a tolerance and a concentricity of a ferrule, will be described below in detail.

First, an optical fiber 10, 10', containing single fiber or multi-fibers containing more than one fiber, is dressed with epoxy. Second, a ferrule 22, 22' having a bore 20, 20' therethrough is made, wherein the bore is larger than a cross-section of optical fiber 10, 10' by at least 0.001 mm.

Third, optical fiber 10, 10' is put into the ferrule bore 20, 20' of ferrule 22, 22'. Fourth, ferrule 22, 22' threaded with the optical fiber 10, 10' is inserted into ferrule holding jig 18, 18'. Fifth, either one end of the optical fiber 10, is passed through first hole 12 in first optical fiber jig 14 and the other end of the optical fiber 10, is passed through second hole 24 in second optical fiber jig 26; or one end of the optical fiber 10' is passed through second hole 26 in second optical fiber jig 26 and the other end of the optical fiber 10' is passed through a third hole 34 in a third optical fiber jig 30. Sixth, optical fiber 10, 10' is aligned in the x, y, and z axis in ferrule bore 20, 20' of the ferrule 22, 22' the control of a control unit 16, 16' manipulation of first optical fiber jig 14, second optical fiber jig 26, and/or third optical fiber jig 30 left/right, up/down and forward/backward, i.e. the X, Y and Z directions. Seventh, fixing the aligned optical fiber 10, 10' in ferrule 22, 22' by hardening the epoxy covering optical fiber 10, 10' naturally or under ultraviolet light. Eighth, after hardening the epoxy, optical fiber jig 14, 26 and 30 is removed from optical fiber 10, 10' and ferrule 22, 22' is removed from ferrule holding jig 18, 18' after marking the position of optical fiber 10, 10' and then the face of ferrule 22, 22' is polished.

With reference to FIGS. 1, 2 and 6, an alignment with the aligning apparatus using tubes instead of ferrules, will be described below in detail.

First, an optical fiber 10, 10', containing single fiber or multi-fibers containing more than one fiber, is dressed with epoxy. Second, a tube 22a, 22a' having a bore 20, 20' therethrough is made, wherein the bore is substantially larger than the cladding of the optical fiber 10, 10' by at least 0.001 mm. Third, optical fiber 10, 10' is put into the ferrule bore 20, 20' of tube 22a, 22a'. Fourth, tube 22a, 22a' threaded with the optical fiber 10, 10' is inserted into ferrule holding jig 18, 18'. Fifth, either one end of the optical fiber 10, is passed through first hole 12 in first optical fiber jig 14 and the other end of the optical fiber 10, is passed through second hole 24 in second optical fiber jig 26; or one end of the optical fiber 10' is passed through second hole 26 in second optical fiber jig 26 and the other end of the optical fiber 10' is passed through a third hole 34 in a third optical fiber jig 30. Sixth, optical fiber 10, 10' is aligned in the x, y, and z axis in ferrule bore 20, 20' of the tube 22a, 22a' by the control of a control unit 16, 16' manipulation of first optical fiber jig 14, second optical fiber jig 26, and/or third optical fiber jig 30 left/right, up/down and forward/backward, i.e. the X, Y and Z directions. Seventh, fixing the aligned optical fiber 10, 10' in tube 22a, 22a' by hardening the epoxy coveting optical fiber 10, 10' naturally or under ultraviolet light. Eighth, after hardening the epoxy, optical fiber jig 14, 26 and 30 is removed from optical fiber 10, 10' and tube 22a, 22a' is removed from ferrule holding jig 18, 18' after marking the position of optical fiber 10, 10' and then the face of tube 22a, 22a' is polished. It should be understood that the tube has a different function than the ferrule, for example, the optical fiber and tube may be inserted into a ferrule when forming a coupling or connecting device.

With reference to FIGS. 1, 2 and 7, an alignment with the aligning apparatus using tubes instead of ferrules, will be described below in detail.

First, an optical fiber 10, 10', containing single fiber or multi-fibers containing more than one fiber, is dressed with epoxy. Second, a ferrule or tube 22b, 22b' having a bore 20, 20' therethrough is made, wherein the bore is substantially larger than the cladding of the optical fiber 10, 10' by at least 0.001 mm. Third, optical fiber 10, 10' is put into the ferrule bore 20, 20' of ferrule or tube 22b, 22b'. Fourth, ferrule or tube 22b, 22b' threaded with the optical fiber 10, 10' is inserted into ferrule holding jig 18, 18'. Fifth, either one end of the optical fiber 10, is passed through first hole 12 in first optical fiber jig 14 and the other end of the optical fiber 10, is passed through second hole 24 in second optical fiber jig 26; or one end of the optical fiber 10' is passed through second hole 26 in second optical fiber jig 26 and the other end of the optical fiber 10' is passed through a third hole 34 in a third optical fiber jig 30. Sixth, optical fiber 10, 10' is aligned in the x, y, and z axis in ferrule bore 20, 20' of the ferrule or tube 22b, 22b' by the control of a control unit 16, 16' manipulation of first optical fiber jig 14, second optical fiber jig 26, and/or third optical fiber jig 30 left/right, up/down and forward/backward, i.e. the X, Y and Z directions. Seventh, fixing the aligned optical fiber 10, 10' in ferrule or tube 22b, 22b' by hardening the epoxy coveting optical fiber 10, 10' naturally or under ultraviolet light. Eighth, after hardening the epoxy, optical fiber jig 14, 26 and 30 is removed from optical fiber 10, 10' and ferrule or tube 22b, 22b' is removed from ferrule holding jig 18, 18' after marking the position of optical fiber 10, 10' and then the face of ferrule or tube 22b, 22b' is polished.

With reference to FIG. 1, FIG. 2, and FIG. 8, a method of aligning an optical fiber 10, 10' obliquely to have a certain angle with respect to the inner surface of the bore 20c, 20c' of tube using the aligning apparatus of the invention will be described below in detail.

First, optical fiber 10, 10' of single fiber or multi-fibers containing more than one fiber is dressed with epoxy. Second, tube 22c, 22c', instead of a ferrule, is made and tube 22c, 22c' has a bore substantially larger than the clad of optical fiber 10, 10'. Third, the dressed optical fiber 10, 10' is put into bore 20c, 20c' of tube 22c, 22c'. Fourth, tube 22c, 22c', threaded with the optical fiber 10, 10', is inserted into ferrule holding jig 18, 18'. Fifth, either one end of the optical fiber 10, is passed through first hole 12 in first optical fiber jig 14 and the other end of the optical fiber 10, is passed through second hole 24 in second optical fiber jig 26; or one end of the optical fiber 10' is passed through second hole 26 in second optical fiber jig 26 and the other end of the optical fiber 10' is passed through a third hole 34 in a third optical fiber jig 30. Sixth, optical fiber 10, 10' is obliquely aligned in the x, y, and z axis in bore 20c, 20c' of tube 22c, 22c' by either moving first optical fiber jig 14 and attached one end of optical fiber 10 to one side and moving at the same time second optical fiber jig 26 and attached other end of the optical fiber 10 to in a opposite direction by control of control unit 16, 16', or moving second optical fiber jig 26 and attached one end of optical fiber 10' to one side and moving, at the same time, third optical fiber jig 30 and attached the other end of the optical fiber 10' in an opposite direction by control of control unit 16, 16'. Seventh, fixing the aligned optical fiber: 10, 10' in tube 22c, 22c' by hardening the epoxy covering optical fiber 10, 10' naturally or under ultraviolet light. Eighth, after hardening the epoxy, optical fiber jig 14, 26 and 30 is removed from optical fiber 10, 10' and tube 22c, 22c' is removed from ferrule holding jig 18, 18' after marking the position of optical fiber 10, 10' and then the face of tube 22c, 22c' is polished.

It should be also noted that optical fiber couplings such as a wavelength multiplexer, an optical filter, an optical isolator, an optical switch, a connector, etc. can be made utilizing the optical coupling formed as described above. FIG. 9 shows an example of one such optical fiber coupling containing a series of lenses 28, optical fiber 10, 10', and ferrule or tube 22, 22'. It should be noted in FIG. 9 that optical fibers 10, 10' do not lie on the axis that is surface normal to the center of lenses 28.

The advantages of an optical fiber aligning apparatus and manufacturing method thereof of the invention will be described below. Since it uses a ferrule tolerance instead of precision centering of an optical fiber, the time required for the manufacture of the product is reduced and in consequence the product economy is improved. While constructing optical fiber couplings, optical fibers are not merely aligned but simultaneously fixed too. When optical fibers containing more than one fiber is connected or coupled, optical fibers can be easily aligned without precision aligning tools. Consequently, the number of steps required for the manufacture of the product is reduced and the productivity is thereby increased. Regarding wavelength multiplexers, etc. containing multiple fibers, a central fiber and surrounding fibers can be selectively placed. Optical fibers of multi-fibers can be easily connected and the loss there can be minimized. Regarding optical fiber couplings using ball lenses, optical fibers can be aligned on a line other than the line surface normal to the center of a lens, so as to reduce the reflection loss. Since the optical fiber in a tube having sufficient tolerance is obliquely aligned with reference to the tube, the ground surface effect is practically implemented.

Therefore, it should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. An aligning apparatus for optical coupling devices, comprising:
    a ferrule, having a ferrule bore confining an optical fiber inserted therein, said bore having a size larger than a cross section of said optical fiber enabling said optical fiber to move freely within said ferrule bore, said ferrule supporting said optical fiber;
    a ferrule holding jig for firmly holding said ferrule;
    a first optical fiber jig adjacent an upper end of said ferrule holding jig, said first optical fiber jig having a first hole at the center thereof for firmly holding said optical fiber already inserted into said ferrule;
    a second optical fiber jig at the lower end of said ferrule holding jig, said second optical fiber jig having a second hole at the center thereof for firmly holding said optical fiber already inserted into said ferrule; and
    a control means controlling the positioning of said first optical fiber jig and said second optical fiber jig for aligning said optical fiber in the X, Y, and Z directions.

2. The apparatus as in claim 1, wherein said ferrule holding jig is in the shape of a sleeve.

3. The apparatus as in claim 1, wherein said ferrule holding jig is in the shape of a cylinder.

4. The apparatus as in claim 1, wherein said first hole of said first optical fiber jig and said second hole of said second optical fiber jig are rectangular or cylindrical in shape.

5. The apparatus as in claim 1, wherein said first optical fiber jig and said second optical fiber jig each comprise a separation chuck for enabling said first optical fiber jig and said second optical fiber jig to be removed from said optical fiber after said control means aligns said optical fiber.

6. The apparatus as in claim 1, wherein said ferrule is made of ceramic or silica.

7. The apparatus as in claim 1, wherein said ferrule holding jig is firmly fixed so that said ferrule holding jig does not move when said control means positions said first optical fiber jig and said second optical fiber jig.

8. The apparatus as in claim 1, wherein said ferrule bore can accommodate more than one fiber.

9. An aligning apparatus for optical coupling devices, comprising:
    a first ferrule having a ferrule bore confining a first optical fiber inserted therein, said bore having a size larger than a cross section of said first optical fiber enabling said first optical fiber to move freely within said ferrule bore, said first ferrule supporting said first optical fiber;
    a first ferrule holding jig for firmly holding said first ferrule;
    a first optical fiber jig adjacent an upper end of said first ferrule holding jig, said first optical fiber jig having a first hole at the center thereof for firmly holding said first optical fiber already inserted into said first ferrule;
    a second optical fiber jig at the lower end of said first ferrule holding jig, said second optical fiber jig having a second hole at the center thereof for firmly holding said first optical fiber already inserted into said first ferrule;
    a second ferrule having a ferrule bore confining a second optical fiber inserted therein, said bore having a size larger than a cross section of said second optical fiber enabling said second optical fiber to move freely within said ferrule bore, said second ferrule supporting said second optical fiber;
    a third optical fiber jig at the lower end of said second ferrule holding jig, said third optical fiber jig having a third hole at the center thereof for firmly holding said second optical fiber already inserted into said second ferrule;
    said second optical fiber jig at the upper end of said second ferrule holding jig, said second optical fiber jig having said second hole at the center thereof for firmly holding said second optical fiber already inserted into said second ferrule; and
    a control means controlling the positioning of said first optical fiber jig, said second optical fiber jig and said third optical fiber jig for aligning said first and second optical fibers in three mutually orthogonal directions.

10. The apparatus as in claim 9, said aligning apparatus is symmetrical with reference to said second optical fiber jig.

11. The apparatus as in claim 9, wherein said first and second ferrule holding jigs are in the shape of a sleeve.

12. The apparatus as in claim 9, wherein said first and second ferrule holding jigs are in the shape of a cylinder.

13. The apparatus as in claim 9, wherein said first hole, said second hole, and said third hole are in the shape of a V-groove or a circle.

14. The apparatus as in claim 9, wherein said first optical fiber jig, said second optical fiber jig, and said third optical fiber jig each comprise at least one separation chuck for enabling said first optical fiber jig, said second optical fiber jig, and said third optical fiber jig to be removed from said first and second optical fibers after the alignment of each end of each said first and second optical fibers.

15. The apparatus as in claim 9, wherein said first ferrule and said second ferrule are made of one of ceramic and silica.

16. The apparatus as in claim 9, wherein said first and second ferrule holding jigs are firmly fixed, so that said first and second ferrule holding jigs do not move when said control means positions said first optical fiber jig, said second optical fiber jig, and said third optical fiber jig.

17. The apparatus as in claim 9, wherein said aligning apparatus can make an optical fiber ferrule having more than one fiber.

18. The apparatus as in claim 9, wherein said second optical fiber jig firmly holds and end of said first and second optical fibers.

19. In an optical fiber alignment independent of ferrule's tolerance and concentricity, a manufacturing method of an optical coupling comprising the steps of:

covering a first optical fiber and a second optical fiber with epoxy;

making two ferrules having a ferrule bore whose diameter is greater than the diameter of said optical fibers cladding by more than 0.001 mm;

inserting said optical fibers into said ferrule bore in each of said ferrules;

inserting said ferrules threaded with said optical fiber into ferrule holding jigs;

passing either one end of said optical fiber through a first hole in a first optical fiber jig and then passing the other end of said first optical fiber through a second hole in a second optical fiber jig, or passing one end of said second optical fiber through a second hole in a second optical fiber jig and then passing the other end of said second optical fiber through a third hole in a third optical fiber jig;

aligning said optical fibers in three mutually orthogonal directions in said ferrule bore of said ferrule by said first optical fiber jig, said second optical fiber jig, and said third optical fiber jig by moving up/down and left/right under the control of a control means;

fixing said optical fiber in said ferrule by hardening the epoxy covering the optical fiber either naturally or under ultraviolet light;

marking the position of said optical fibers after the hardening of said epoxy; and removing said ferrules from said ferrule holding jigs, and then grinding the faces of said ferrules.

20. The method as in claim 19, wherein said optical fiber consists of multi-fiber containing more than one fiber.

21. In an optical fiber alignment without ferrules, having various configurations of optical fibers, a manufacturing method of an optical coupling comprising the steps of:

covering a first optical fibers and a second optical fiber with epoxy;

making two tubes, substitute for ferrules, having a hole whose diameter is much greater than the diameter of said optical fibers cladding;

inserting said optical fibers into said holes in each of said tubes;

inserting said tubes threaded with said optical fiber into ferrule holding jigs;

passing either one end of said first optical fiber through a first hole in a first optical fiber jig and passing the other end of said first optical fiber through a second hole in a second optical fiber jig, or passing one end of said second optical fiber through a second hole in a second optical fiber jig and passing the other end of said second optical fiber through a third hole in a third optical fiber jig;

aligning said optical fibers in three mutually orthogonal direction in each of said hole of said tubes by said first optical fiber jig, said second optical fiber jig, and said third optical fiber jig moving up/down and left/right in various direction under the control of a control means;

fixing said optical fiber in said tube by hardening the epoxy covering the optical fiber either naturally or under ultraviolet light;

marking the position of said optical fibers after the hardening of said epoxy; and removing said tubes from said ferrule holding jigs, and then grinding the faces of said tubes.

22. In an optical fiber alignment having optical fibers aligned obliquely to have a predetermined angle with respect to a ferrule, a manufacturing method of an optical coupling comprising the steps of:

covering a first optical fibers and a second optical fiber with epoxy;

making two tubes, substitute for ferrules, made of ceramic or silica having a hole whose diameter is much greater than the diameter of said optical fibers cladding;

inserting said optical fibers into said holes in each of said tubes;

inserting said tubes threaded with said optical fiber into ferrule holding jigs;

passing either one end of said first optical fiber through a first hole in a first optical fiber jig and passing the other end of said first optical fiber through a second hole in a second optical fiber jig, or passing one end of said second optical fiber through a second hole in a second optical fiber jig and passing the other end of said second optical fiber through a third hole in a third optical fiber jig;

aligning the first optical fiber in three mutually orthogonal axes obliquely by either moving the first optical fiber jig and attached one end of the first optical fiber to one side and moving at the same time the second optical fiber jig and attached the other end of the second optical fiber to the other side both by a control unit, or moving the second optical fiber jig and attached one end of the second optical fiber to one side and moving, at the same time, the third optical fiber jig and attached the other end of the second optical fiber to the other side both by a control unit;

fixing said optical fiber in said tube by hardening the epoxy covering the optical fiber either naturally or under ultraviolet light; and marking the position of said optical fibers after the hardening of said epoxy, removing said tubes from said ferrule holding jigs, and then grinding the faces of said tubes.

23. An aligning apparatus for terminating and end of an optical fiber, comprising:

a ferrule having a bore for receiving one end of an optical fiber precoated with an epoxy;

an immobile ferrule holding jig for firmly holding said ferrule;

a first optical fiber jig adjacent a first end of said ferrule holding jig, said first optical fiber jig having at least one hole for firmly holding said optical fiber after said one end of said optical fiber has been received in said bore of said ferrule;

a second optical fiber jig adjacent a second end of said ferrule holding jig, said second optical fiber jig having at least one hole for firmly holding an end of a second optical fiber; and a control means controlling the positioning of said first optical fiber jig in a three dimentional space for aligning said first optical fiber with said second optical fiber.

24. The apparatus as in claim 23, wherein said ferrule holding jig is cylindrical.

25. The apparatus as in claim 23, wherein said ferrule is made of ceramic.

26. The apparatus as in claim 23, wherein said ferrule is made of silica.

27. The apparatus as in claim 23, said control means controlling the positioning of said second optical fiber jig in a three dimentional space.

28. The apparatus as in claim 23, wherein said first optical fiber jig and said second optical fiber jig each comprise a separation chuck for enabling said first optical fiber jig and said second optical fiber jig to be removed from said first and second optical fibers, respectively.

29. In an optical fiber alignment independent of ferrule's tolerance and concentricity, a manufacturing method of an optical coupling or terminating and end of an optical fiber comprising the steps of:

covering one end of a first optical fiber with epoxy;

inserting said one end of said first optical fiber covered with said epoxy into a bore of a ferrule;

inserting said ferrule into an immobile ferrule holding jig;

clamping said first optical fiber in a first optical fiber jig;

clamping one end of a second optical fiber in a second optical fiber jig;

aligning said first and second optical fibers by moving said first optical fiber jig in a three dimentional space under the control of a control unit;

fixing said first optical fiber in said ferrule by hardening said epoxy covering said one end of said first optical fiber;

removing said ferrule from said ferrule holding jig after said fixing step; and grinding the face of said ferrule.

30. The method as set forth in claim 29, further comprising a step of moving said second optical fiber jig in a three dimentional space under the control of a control unit during said aligning step.

* * * * *